United States Patent [19]

Iwasaki et al.

[11] 4,216,357

[45] Aug. 5, 1980

[54] OPTICAL PLAY-BACK SYSTEM FOR RECORDED SIGNALS WITH OSCILLATING BEAM

[75] Inventors: Norio Iwasaki; Toshio Satoh, both of Tokyo; Hiroyuki Ito, Kawasaki; Ikuya Koike, Narashino, all of Japan

[73] Assignee: Fuji Telecasting Co., Ltd., Tokyo, Japan

[21] Appl. No.: 743,661

[22] Filed: Nov. 22, 1976

[30] Foreign Application Priority Data

Mar. 1, 1976 [JP] Japan .................................. 51-21198

[51] Int. Cl.$^2$ .......................... G11B 11/00; G11B 7/12
[52] U.S. Cl. ........................ 179/100.1 R; 179/100.1 A; 179/100.3 A; 179/100.3 V; 179/100.4 R; 179/100.41 L; 250/202
[58] Field of Search ............... 179/100.41 L, 100.3 V, 179/100.4 R, 100.41 K, 100.1 R, 100.3 R, 100.3 A, 100.1 A; 340/173 LT, 173 LM; 250/202, 203 R, 566, 570, 201, 578, 234

[56] References Cited

U.S. PATENT DOCUMENTS

| | | | |
|---|---|---|---|
| 2,347,084 | 4/1944 | Cooney | 179/100.3 A |
| 2,487,511 | 11/1949 | Bedford | 179/100.3 R |
| 2,575,445 | 11/1951 | Gemrer | 179/100.3 A |
| 3,138,669 | 6/1964 | Rabinow | 179/100.4 R |
| 3,335,219 | 8/1967 | Goldmark et al. | 179/100.3 A |
| 3,769,468 | 10/1973 | Shutterly | 179/100.3 A |
| 3,860,766 | 1/1975 | Mori | 179/100.4 R |
| 3,975,598 | 8/1976 | Green et al. | 179/100.3 A |
| 3,975,630 | 8/1976 | Zorn | 250/202 |
| 3,992,593 | 11/1976 | Heine | 179/100.3 V |

*Primary Examiner*—Raymond F. Cardillo, Jr.

*Attorney, Agent, or Firm*—Fidelman, Wolffe & Waldron

[57] ABSTRACT

This invention relates to a system for optically playing back recorded signals from a recorded medium on which signals of images or sounds are continuously recorded so as to constitute a signal recorded line or signal track. In play-back the images or sounds are optically recognized by the width-change of the signal recorded line. A narrow light beam for the play-back is deflected at a predetermined frequency in the direction perpendicular to the signal recorded line, i.e. in the direction of the width of the signal recorded line, in order to perform the optical scanning. The narrow light beam which is reflected or transmitted on the recorded medium surface reaches photo-sensitive elements such as photo-diodes. Electrical outputs obtained from the photo-sensitive elements are relatively compared with electric signals (standard pulses) obtained from fundamental electric signals for deflecting the said narrow light beam at a predetermined frequency, so that the amplitude of the recorded signal at each differential point of the signal recorded line is continuously detected as length-amount, and a modulated wave is continuously obtained from the length-amount. The modulated wave is further decoded, compensated, and amplified so as to obtain the play-back signals corresponding to the continuous width-change of the signal recorded line. The play-back system is provided with a tracking mechanism by which the play-back mechanism can follow the signal recorded line, and an interval adjusting mechanism for maintaining the vertical interval between the play-back mechanism and the signal recorded line uniform.

14 Claims, 23 Drawing Figures

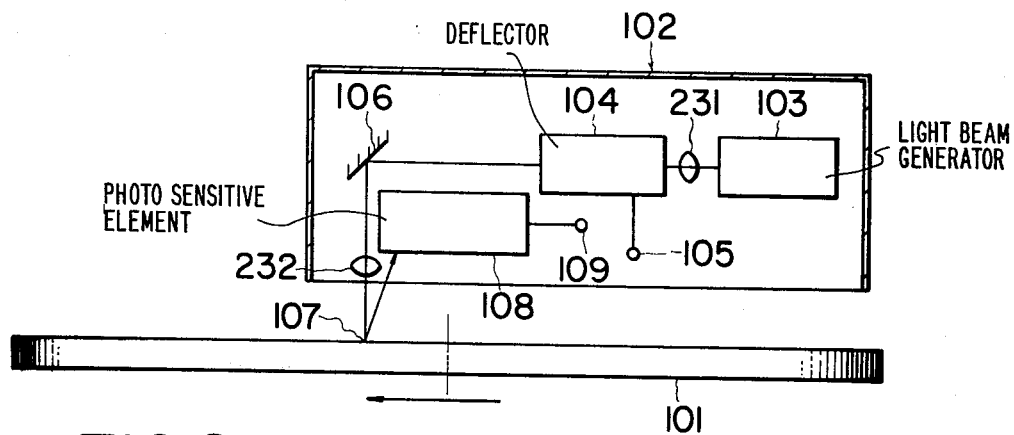
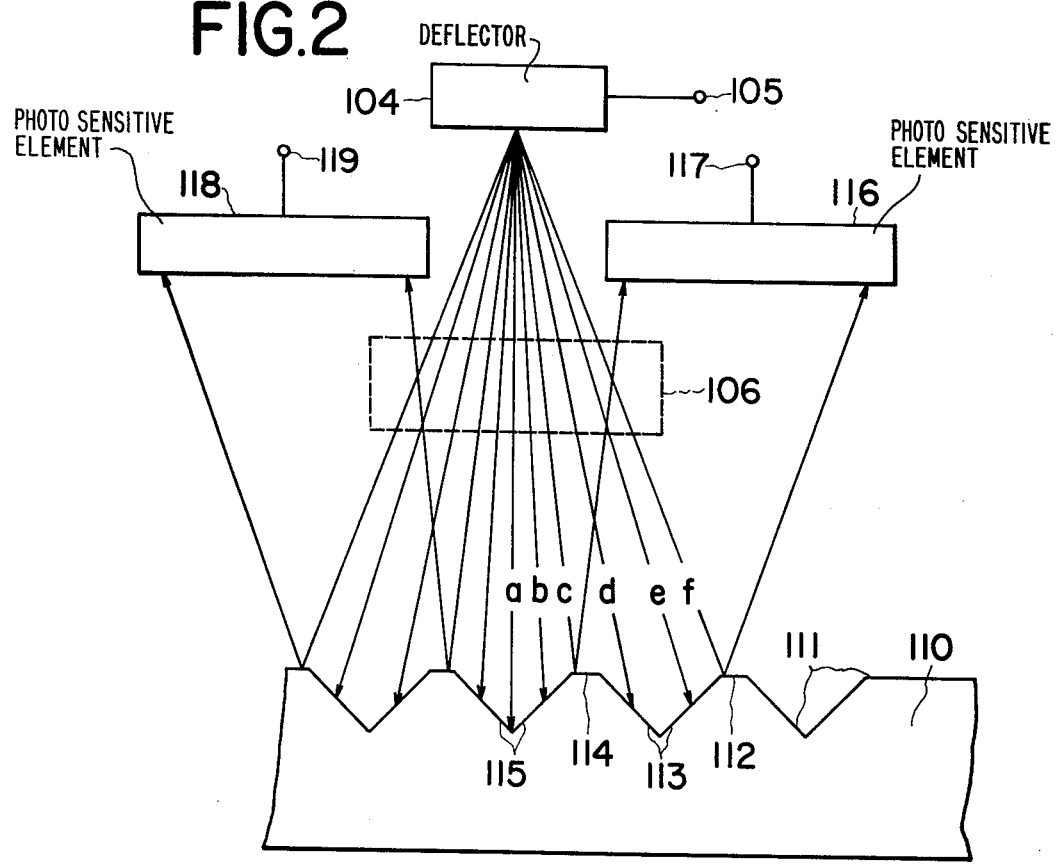

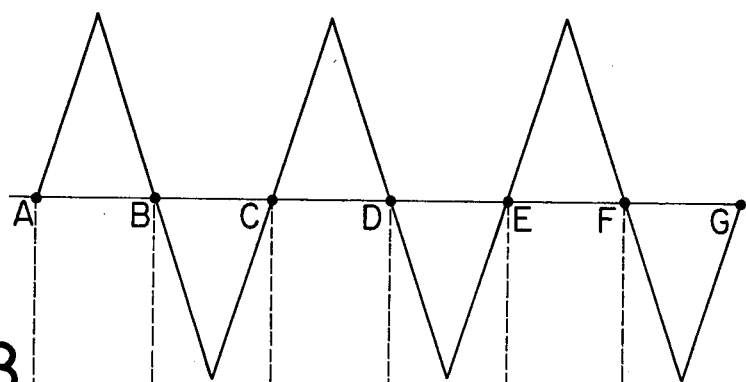
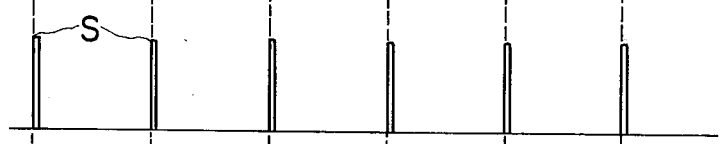
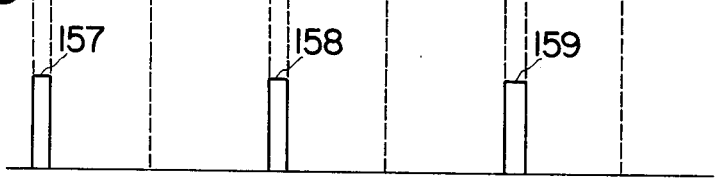

$t_R = t_L$ $t_R > t_L$ $t_R < t_L$

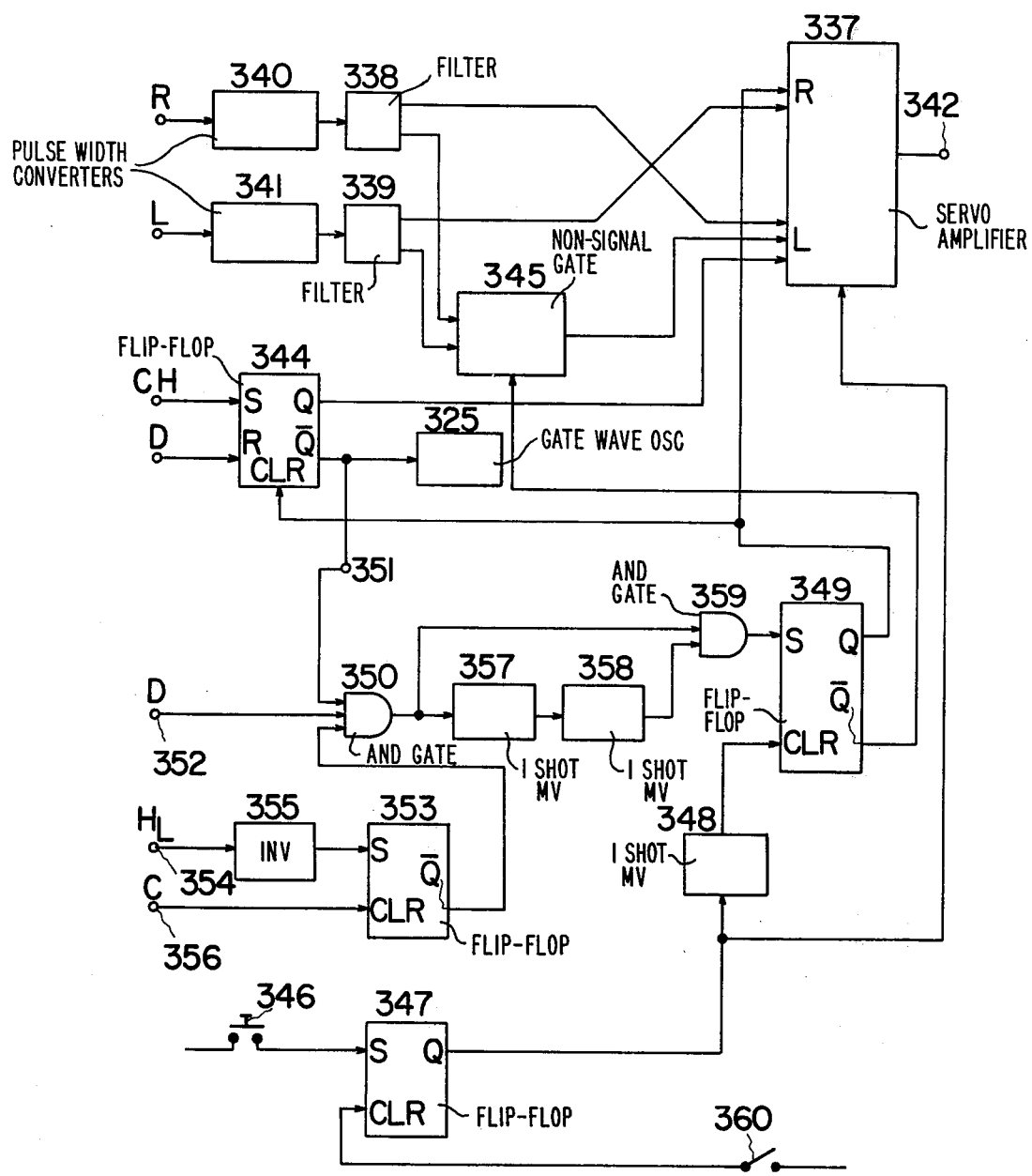

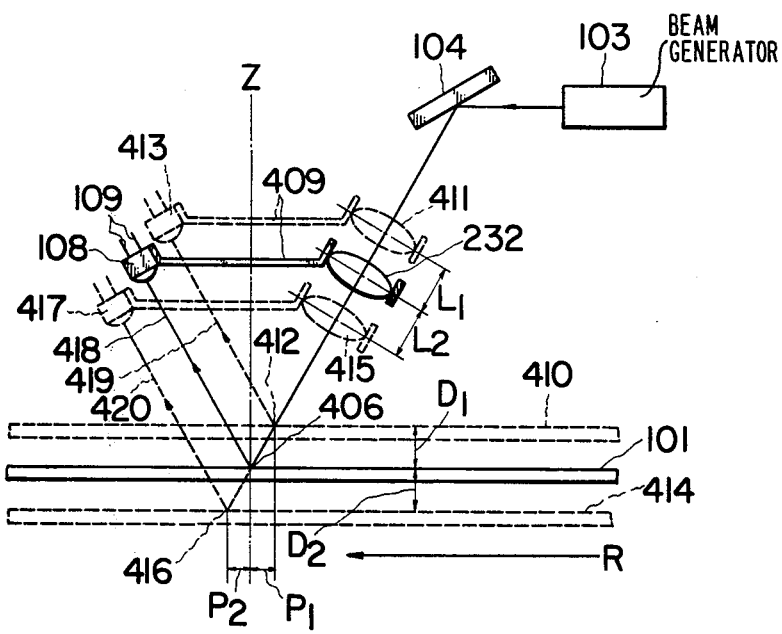
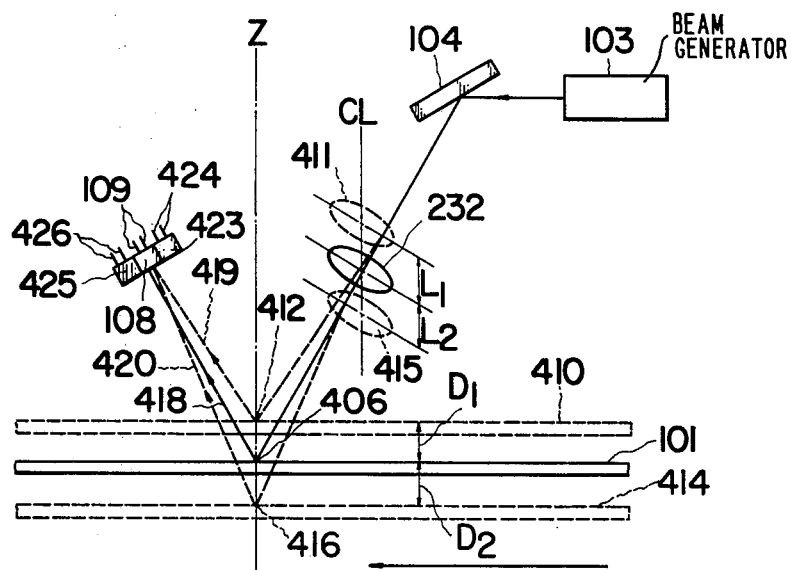

OPTICAL PLAY-BACK SYSTEM FOR RECORDED SIGNALS WITH OSCILLATING BEAM

SUMMARY OF THE INVENTION

This invention relates to a play-back system for optically playing back video or audio signals from a recorded medium such as video-disk, audio-disk record or optically recorded film.

In order to play back recorded signals such as sounds from an audio-disk record, mechanical play-back systems are generally employed using mechanically oscillating means such as a stylus. In such systems, there are frequently defects such that the distortion of the played-back signals is large; for example, noise is caused by scratches, audio-disk records are damaged; and styluses wear.

The first object of the present invention is to provide a system for optically playing back recorded signals without using any mechanically oscillating means such as a stylus in order to eliminate the above defects.

In the conventional optical play-back system, an optical fiber is disposed above the signal recorded track so that images of the recorded track are projected and enlarged, and the light intensity of the image is measured so that the physical variations of the recorded track are directly converted to analogous variations in strength of electric signals. However, in this system, the signal to noise ratio is very bad; therefore it has been very difficult to make the system practical.

The second object of the present invention is to provide an optical play-back system which provides a very high signal to noise ratio and which can be practically used.

In order to achieve these objects, optical scanning is executed by deflecting a narrow light beam in the direction of the width of the signal track at predetermined intervals. The narrow light beam is reflected or transmitted at the surface of the recorded medium, and picked up at photo-sensitive elements. The electrical outputs obtained from the photo-sensitive elements are compared in relation to standard pulses obtained from known reference signals used for deflecting the said narrow light beam at said predetermined intervals. The amplitude of the recorded signal at each differential point of the signal recorded line is continuously detected as a length-amount or time duration (pulse width), and a modulated wave is continuously obtained from the length-amount. The continuously modulated wave is decoded, compensated, and amplified so as to obtain play-pack signals corresponding to the continuous width-change of the signal recorded line. Namely, the feature of the present invention is to convert the analog change in width of the signal recorded line or track into the length-amount at each differential point along the track.

Additional objects of the present invention are to provide an optical play-back system having a tracking mechanism which causes the play-back mechanism to accurately follow the recorded track and a gap-adjusting mechanism for uniformly maintaining the vertical spacing between the play-back mechanism and the recorded signal track.

Other objects and feature of the present invention will be apparent from the following detailed description of the invention.

BRIEF DESCRIPTION OF THE DRAWING

FIG. 1 is a semi-schematic view indicating the principle of the optical play-back system of the present invention;

FIG. 2 is a view showing a narrow light beam, issued from a deflector, incident upon a record surface and partly reflected there so as to reach photo-sensitive elements;

FIG. 7 is a diagram showing an example of a deflection wave;

FIG. 8 is a diagram indicating positions of standard signals made from a fundamental oscillator for deflection;

FIG. 9 is a diagram indicating a line of electric signal pulses obtained at the outputs of photo-sensitive elements by the right deflection;

FIG. 10 is a diagram indicating pulse signals corresponding to the widthes of the required signal recorded groove;

FIG. 21 is a block diagram of an automatic play-back apparatus;

FIG. 22 is an explanatory view indicating the movement of the reflected point on the medium surface at the time of moving a converging lens along the axis of the incident light in order to maintain its focal distance uniform in accordance with the vertical movement of the recorded medium surface; and FIG. 23 is an explanatory view of a mechanism for compensating the change of the focal distance due to the vertical movement of the recorded medium surface, in which a converging lens is moved along the perpendicular axis of the recorded medium surface.

DETAILED DESCRIPTION OF THE INVENTION

Figure 3:
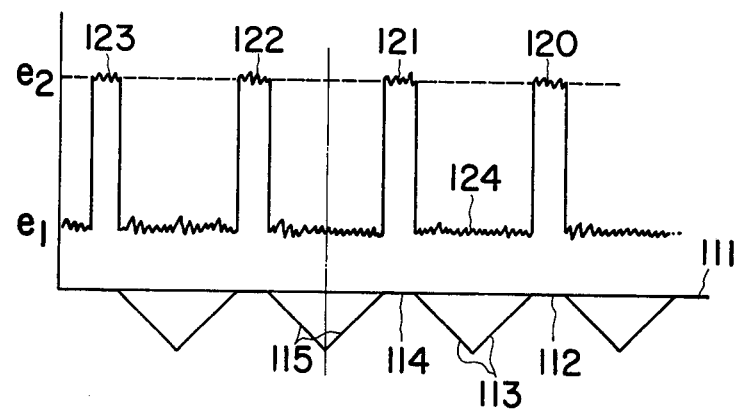
FIG. 3 is a diagram of electrical signal pulses obtained at the photo-sensitive element of FIG. 2 by optical scanning on the surface of a recorded medium.

The present invention will be described with respect to an audio disk record, i.e. an LP record, because it is generally considered that the optical play-back of an audio disk record is most complex in comparison with play-back from other recorded mediums. Here are stated some reasons why it is complex. There are separate recorded signals on both sides of one recorded groove, when an LP record is stereophonic. Neither the width at a point in a recorded groove, the average width dimension, nor the interval between adjacent signal recorded grooves are uniform. Further, the surface of the recorded medium is not level, but rather is uneven.

FIG. 1 is a semi-schematic view indicating the principle of the system of this invention of optical scanning and photoelectric conversion. In the drawing, it is assumed that the audio disk record (hereinafter referred to as a record) (101) is turning in the direction of the arrow with respect to the photoelectric cartridge (102). The narrow light beam generator (103) is a semiconductor laser oscillator. In alternative embodiments, the beam generator 103 may be a helium neon laser oscillator, a luminous diode, or an incandescent light source. The light beam issued from the generator (103) is incident upon the deflector (104). The power to drive the deflector (104) is inputted to the terminal (105). The deflector (104) is a deflection mirror using a distortion element, e.g., pockels cell, electric distortion element, or magnetic distortion element. The light beam passed through the deflector (104) is repeatedly deflected in the direction vertical to the drawing, is reflected by the reflector (106), reaches the signal recorded surface (107) of the record (101), and is reflected again so as to reach the photo-sensitive element (108) such as photodiode.

In the above description, the light beam issued from the generator (103) should be very narrow. Because some expansion or spreading exists in the light beam, and it is difficult to obtain fine and small spot on the signal recorded surface, a long-focus lens (231) and a semi-cylindrical lens (232) of short-focus are used for convergence as a countermeasure.

Electrical output of the photo-sensitive elements (108) is given to the terminal (109). The photo-sensitive elements (108) are provided on both sides of the deflected beam. (not shown in FIG. 1).

FIG. 2 is an explanatory view showing the condition where a narrow light beam issued from the deflector 104 is incident upon the record surface, and partly reflected there so as to reach the photo-sensitive elements 116, 118. The deflector (104) receives a deflecting voltage at the terminal (105), and deflects the light beam from (a) to (f). The beam is deflected again at the reflector (106), and reaches the record surface (111). As shown in the section (110) of the record, the record surface consists of the signal recorded grooves (113) and (115) and the non-recorded parts (112) and (114). When incandescent light beam or laser light beam is irradiated on the record surface from the upper part, and the irradiated part is observed from the upper part with a microscope, it is clearly understood that the signal recorded grooves (113) and (115) are seen black and dark, and the non-recorded parts (112) and (114) are seen light and bright. Assuming that the tracking is performed on the signal recorded groove (115), the central part of the deflected narrow light beam is (a), and the deflection is made rightwards, i.e. (a)→(b)→(c)→(d)→(e)→(f), as shown in the drawing, the narrow light beam (a) and (b) reaching within the signal recorded groove (115) permiates, diffuses, and is absorbed on the recorded surface, and is partly reflected in different directions, and therefore the light beam does barely reach the photo-sensitive element (116). When the narrow light beam (c) reaches the non-recorded part (114), since the surface of the non-recorded part is very even, it is partly reflected so as to reach the photo-sensitive element (116). When the narrow light beam is deflected as designated by (d) and (e), and reaches the signal recorded groove (113), the beam (d) and (e) does barely reach the photo-sensitive element (116) similarly to the above. Moreover, when the narrow light beam is deflected as designated by (f), the narrow light beam (f) is incident upon the non-recorded part (112), and therefore reaches the photo-sensitive element (116).

As the result, the terminal (117) of the photo-sensitive element (116) gets electrical output pulses corresponding to the non-recorded parts (114) and (112). The same thing is applied also in the case that the narrow light beam returns as (f)→(e)→(d)→(c)→(b)→(a). When the deflection is made leftwards from the center (a), the output terminal (119) of the photo-sensitive element (118) gets the electrical signal pulses corresponding to the non-recorded parts similarly to the above.

Figure 4:
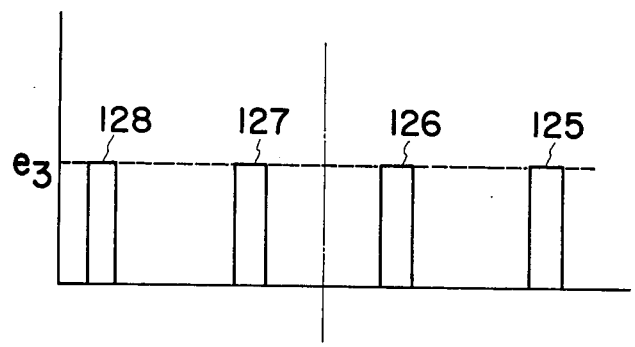
FIG. 4 is a diagram of processed electric signal pulses.

FIG. 3 is a diagram of the electrical signal pulses obtained at the photo-sensitive element with respect to the signal recorded grooves at the time of performing the optical scanning on the surface of the recorded medium. In the drawing, the non-recorded parts (112) and (114), and the signal recorded grooves (113) and (115) are indicated on the section of the record (111), and the electrical signal pulses (120) and (121) having the voltage ($e_2$) are obtained corresponding to the non-recorded parts. Similarly, the electrical signal pulses (122) and (123) are obtained in the leftward deflection. Since the electrical signal pulse outputs (120), (121), (122) and (123) include noise having the voltage ($e_1$) corresponding to the faint current (124), the clear electrical signal pulses (125), (126), (127) and (128) having the voltage ($e_3$) can be obtained as shown in FIG. 4 by passing through the slicing and clipping circuits. The spot section of the narrow light beam is usually circular, and the circumference is not so bright as the center. Therefore, the rise of the practical electrical signal pulses (125), (126), (127) and (128) is not so steep as that shown in the drawing. Accordingly, the electrical signal pulses may be passed through a schmitt circuit in order to obtain more nearly square pulses.

Figure 5:
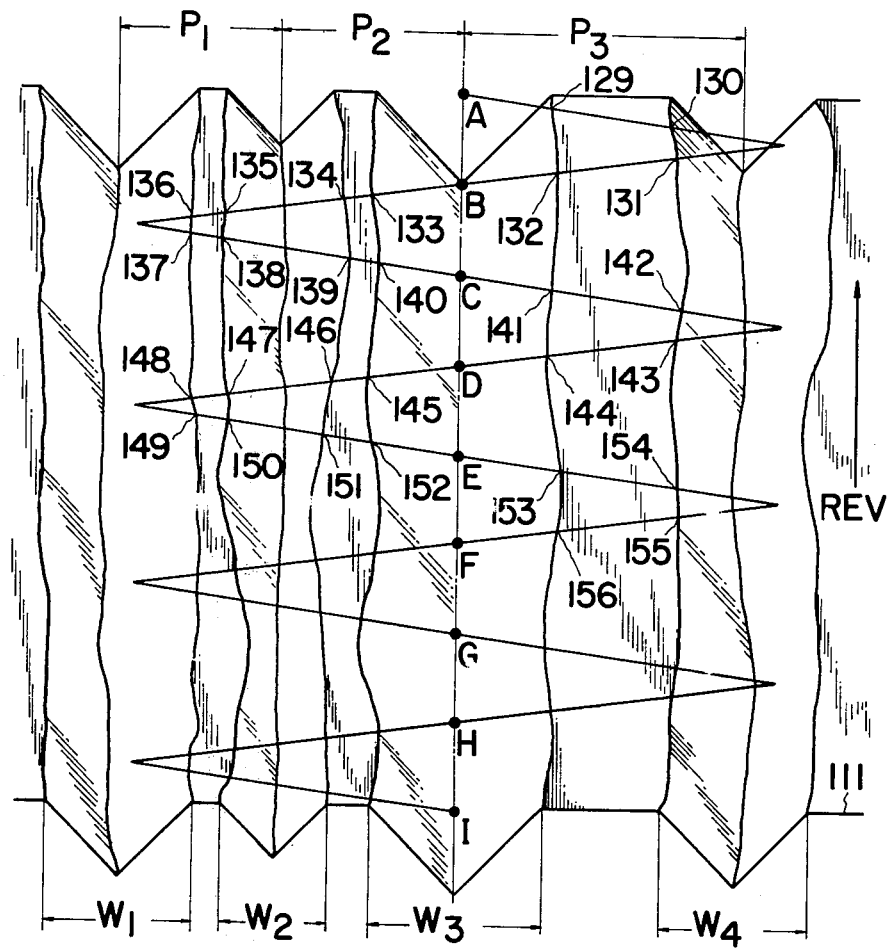
FIG. 5 is a view indicating positions where the electric signal pulses are generated while optically scanning the signal recorded groove of a practical record disk.

FIG. 5 shows positions where the electrical signal output pulses are generated at the time of optically scanning the signal recorded groove of the practical record. The signal recorded grooves ($W_1$), ($W_2$), ($W_3$) and ($W_4$) are carved on the record (111), and the intervals between the grooves ($W_1$) and ($W_2$), ($W_2$) and ($W_3$), and ($W_3$) and ($W_4$) are respectively designated by the pitches ($P_1$), ($P_2$) and ($P_3$) in the drawing. The width of the signal recorded grooves ($W_1$), ($W_2$), ($W_3$) and ($W_4$), and the interval of the pitches ($P_1$), ($P_2$) and ($P_3$) change in accordance with the strength and the frequency of the next recorded signals, and are not uniform. Assuming that the tracking is performed on the signal recorded groove (W₃), the record is turning in the direction of the arrow shown in the drawing, and the narrow light beam is deflected in the direction of the width of the groove with the uniform amplitude and frequency, when the optical scanning is executed with the triangular wave as shown in the drawing, i.e. (A) - (129) - (130)-(131) - (132) - (B) - (133) - (134) - (135) - (136) - (137) - (138) - (139) - (140) - (C), electrical signal pulses are obtained at the non-recorded parts (129) - (130) and (131) - (132) in the right deflection with respect to the tracking groove (W₃) shown in FIG. 5, and at the non-recorded parts (133) - (134), (135) - (136), (137) - (138), and (139) - (140) in the left deflection as described referring to FIGS. 2, 3 and 4. The pulses are shown in FIG. 6.

Figure 6:
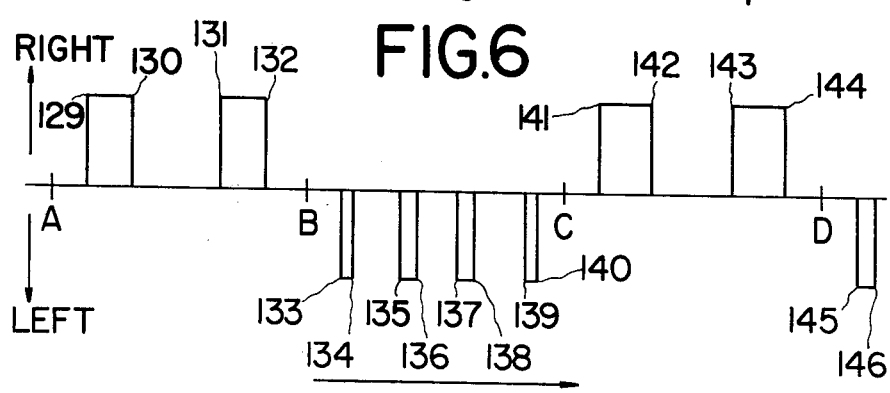
FIG. 6 is a diagram in which electric signal pulses obtained from the scanned record surface are arranged on a time axis.

In FIG. 6, the electrical signal pulses obtained from the record surface on which the optical scanning was performed are shown on the time axis. The right deflection is shown on the upper side of the time axis, and the left deflection is shown on the lower side thereof. The electrical signal pulses (129) - (130), (141) - (142), . . . are obtained on one way in the right deflection, and the electrical signal pulses (131) - (132), (143) - (144), . . . are obtained on the reverse way in the right deflection. Similarly, the electrical signal pulses (133) - (134), (135) - (136), (145) - (146), (147) - (148), . . . are obtained on one way in the left deflection, and the electrical signal pulses (137) - (138), (139) - (140), (149) - (150), (151) - (152), . . . are obtained on the reverse way in the left deflection. Centers of the amplitude in the optical scanning are designated by the capitals (A), (B), (C), (D), . . . in the drawing. The capitals (A), (B), (C), (D), (E), (F), (G), (H) and (I) are in conformity with the average center of the width of the signal recorded groove, i.e. the pitch line.

The method of extracting only required recorded signals will be described hereinafter referring to FIGS. 7, 8, 9 and 10. In FIG. 7, the wave form in the light deflection scanning is shown as a triangular wave. A line of the standard signal pulses (S) is shown in FIG. 8 which are in conformity with the central points (A), (B), (C), (D), (E), (F), . . . of the deflecting amplitude in the optical scanning as shown in FIG. 7 with respect to time. Such pulses can be easily made from the fundamental oscillator for the optical scanning as shown in FIG. 7 e.g., through a frequency converting circuit, a schmitt circuit, a differentiating circuit, a multivibrator, and the like. In FIG. 9, the electric signal pulses are shown which are obtained in the right deflection as shown in FIG. 6.

Assuming that the standard signal pulses (S) shown in FIG. 8 are given to the resetting input of a kind of bistable multivibrator, i.e. the R-S flip-flop circuit, and the electrical signal pulses (129) - (130), (131) - (132), . . . obtained in the right deflection as shown in FIG. 9 are given to the setting input, since the polarity of the electrical signal pulses (129) - (130) and (131) (132) are the same as each other, only the electrical signal pulse (129) - (130) is effective at the setting input in one reciprocation of the right deflection. As the result, the standard signal pulse and the electrical signal pulse (157) which is up to the edge of the signal recorded groove on which the tracking is being performed are obtained as shown in FIG. 10 as R-S flip-flop output during the time (A) - (B) shown in FIG. 7. Similarly, the electrical signal pulses (158) and (159) are respectively obtained during (C) - (D) and (E) - (F). Accordingly, a line of electrical signal pulses is obtained the time duration of which is corresponding to the interval between the average center and the edge of the signal recorded groove on which the tracking is performed. One pulse is obtained per one right deflection of the narrow light beam. The tracking is performed along the average center of the width of the signal recorded groove as described later. Since the center of the deflection of the narrow light beam is disposed on the same position, the time duration of the electrical signal pulses shown in FIG. 10 is fully corresponding to the right amplitude of the recorded signal, and thereby the pulse-width modulated wave can be obtained which has the same width as that of the right side from the average center of the groove. In the left deflection, it is also possible to obtain the pulse-width modulated wave having the same width as that of the left side from the average center of the groove. The modulated waves are decoded by a low-pass filter or the like so that the right and left decoded signals can be extracted.

In the above description, R-S flip-flop circuit is used in order to extract the pulse-width modulated waves. Other circuit, however, combined with a gate circuit having the same function may be used. If only the electrical pulses are extracted which are corresponding to the demarcation points (129), (141), (153), . . . between the signal recorded grooves and the non-recorded parts as shown in FIG. 5, it is possible to obtain the wave the phase of which is modulated by the right signals of the original recorded signal. Accordingly, it is needless to say that play-back signals can be obtained by detecting and decoding the phase modulated wave. Moreover, since it is well supposed that the light beam incident upon the photo-sensitive element becomes an amplitude modulated wave the carrier of which is deflecting frequency after the optical scanning has been performed, if the carrier component is removed from the amplitude modulated wave, it is possible to obtain similarly electrical pulses corresponding to the demarcation points (129), (141), (153), . . . . Accordingly, it is needless to say that a pulse-width modulated wave or a phase modulated wave can be obtained through the abovementioned processes.

In FIGS. 5 and 7, the deflected wave of the narrow light beam is shown as a triangular wave for convenience' sake. It may be, however, a sine wave, a sawtooth wave, or the like. If straight deflection is executed, there is a part where the amplitude of the signal is large, i.e. a little extention of a signal is caused in the direction in which the width of the signal recorded groove becomes large. Therefore, in case that strictness is particularly required, it is preferable to compensate the decoded signals by passing through a compression circuit. The amplitude of the deflection on the signal recorded surface is sufficient, if it is a little larger than the largest width of a groove (sum of the largest widthes of right and left parts measured from the average center). When in an alternative embodiment a semicylindrical lens is used instead of the deflector (104) shown in FIG. 1, if this lens is oscillated in the direction of the optical axis so that the direction of the lens effect becomes the same as that of the width of the signal recorded grooves, similar optical scanning can be carried out. It can be also supposed that the light deflection scanning can be carried out by the oscillation or the rotation of a reflector. However, giving mechanical vibration or rotation to a lens or a reflector is a little difficult when the light deflection, i.e. optical scanning frequency, becomes high.

In FIGS. 1 and 2, the reflector (106) is shown as a plane mirror. If the surface of the reflector (106) is circular, the deflecting voltage or power to be given to the terminal (105) of the deflector (104) can be remarkably decreased. In that case, however, since the dimension of the spot of the narrow light beam is enlarged, careful consideration is required.

Figure 11:
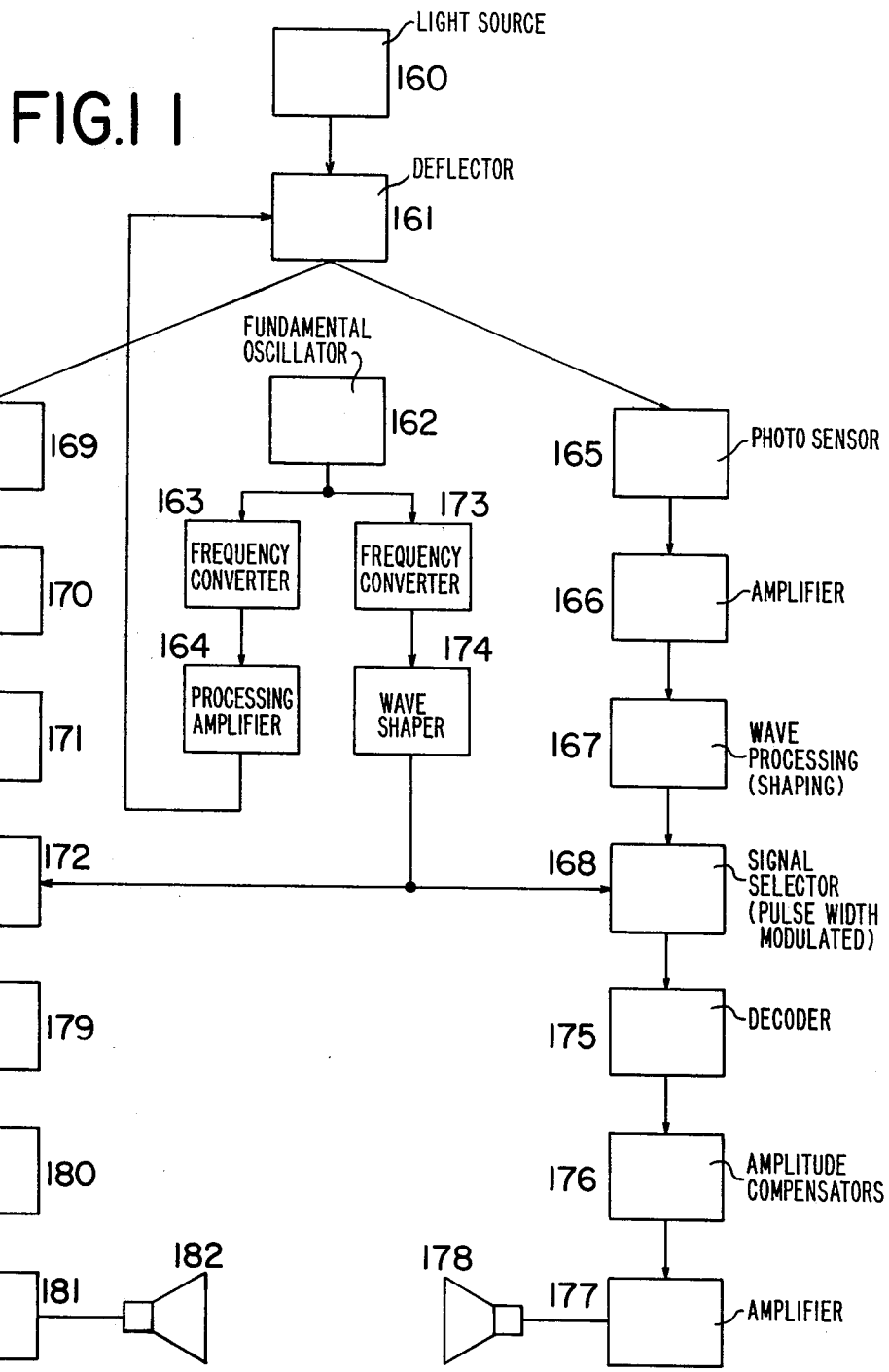
FIG. 11 is a block diagram for the optical play-back of the present invention.

FIG. 11 is a block diagram for the play-back of a stereophonic record. A light source, e.g., incandescent, a laser oscillator, or the like can be used as the narrow light beam generator (160). The dimension of the spot of the narrow light beam irradiated upon the surface of a recorded medium is one which makes it possible to analyse the wave length of the maximum frequency in the recorded signal components. Assuming that the diameter of the innermost circle of the signal recorded groove of an LP record of $33\frac{1}{3}$ r.p.m. is 12 cm., and the maximum frequency is 30 kHz, one-wave length at the signal recorded groove is approximately 7 μm. Therefore, the dimension of the optical scanning spot should be less than 3.5 μm.

The light beam issued from the generator (160) passes through the deflector (161). Since recorded signals are sampled at a rate set by the deflecting frequency of the deflector (161), if the frequency of the recorded signal is 30 kHz, the deflecting frequency should be more than 60 kHz. Deflecting electrical signals are given to the deflector (161) which are generated at the fundamental oscillator (162) e.g., a crystal oscillator, converted so as to have the necessary frequency by the frequency converter 163, and amplified after processing by the processing amplifier 164 so as to have the required wave form.

The light beam reflected from the record surface reaches the right photo-sensitive element (165) and the left photo-sensitive element (169) so as to generate electrical outputs. The electrical signals are respectively amplified at the amplifiers (166) and (170), and pass through the wave form processing or shaping circuits (167) and (171), and thereafter trigger or gate pulses are generated. These electrical trigger or gate signals are respectively supplied to the recorded signal selecting circuits (168) and (172). As described before, an R-S flip-flop circuit or a combined gate circuit is used as the selecting circuit. On the other hand, a standard signal pulse is given to the recorded signal selecting circuits (168) and (172). The standard signal pulse is generated at the fundamental oscillator (162), its frequency is converted by the frequency converter (173), and its form, voltage, and phase are processed by the wave form processing circuit (174).

The circuits 172, 168 generate signals of pulse widths related to the time differences between the applications of the standard signal pulse and the trigger or gate pulse. The outputs of the selecting circuits (168) and (172) are pulse width modulated by the recorded signals as described above, and are respectively supplied to the decoding circuits (175) and (179).

The decoding circuit, 168, 170 includes a low pass filter which passes frequencies only in the recorded signal range. The recorded signals obtained from the decoding circuits (175) and (179) are supplied to the amplitude compensators (176) and (180) as required so as to be compressed in accordance with the degree of the amplitude. The recorded signals obtained from the amplitude compensators (176) and (180) are respectively amplified at the amplifiers (177) and (181), and respectively supplied to the speakers (178) and (182).

As the result, right signal output can be obtained at the speaker 178, and left signal output at the speaker 182. In the play-back of a 4-channel system, it is needless to say that additional parallel decoding circuits are required in addition to the above circuits. In the drawing FIG. 11, the power source is omitted.

Hereinbefore, the play-back of a stereophonic record has been described. It will be clearly understood, that, if signals recorded on a medium surface can be optically recognized, the playback can be carried out on any type of medium in accordance with the present play-back system by analogy with the above description. For example, it is possible to pick up FM signals from a video disk on which FM signals are irregularly recorded.

Figure 12:
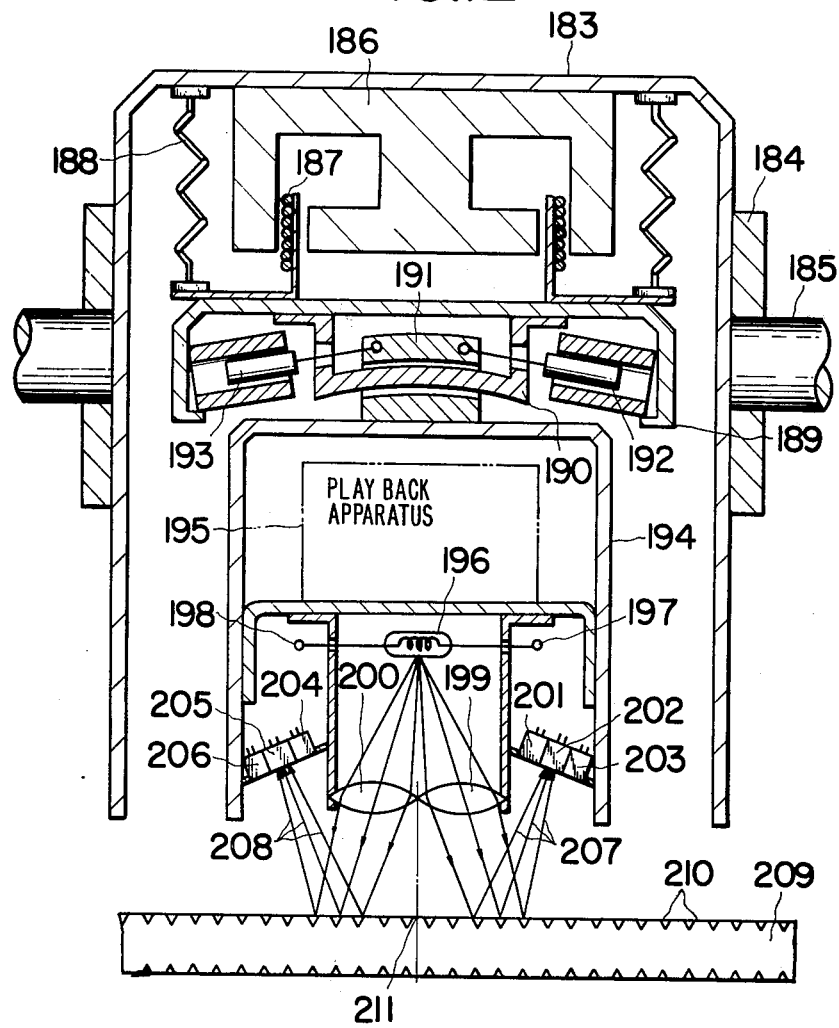
FIG. 12 is a sectional elevation view of a mechanism for compensating inclination and distance in order to maintain the photoelectric play-back mechanism perpendicular to the record surface and at the predetermined distance from the surface.

The means for tracking the play-back light beam on the selected signal recorded track, e.g. record groove, will be described hereinafter. But prior to that, a relative displacement compensating mechanism will be described by which an optical scanning mechanism is automatically adjusted so as to be retained vertical to, and at a uniform distance from, the tracking point on a warped record surface. In FIG. 12, an outer housing 183 containing a photoelectric play-back mechanism is supported on the guide rail 185 by means of the bearing 184 attached to the outer housing 183. The outer housing 183 slides radially relative to the record surface. The inner housing 194 containing the photoelectric play-back mechanism is suspended in a vertically movable manner by a motor mechanism which consists of a magnet 186 attached to the outer housing 183, a moving coil 187, and a suspending damper 188. The inner housing 194 is also suspended by the sliding piece 191 which slides on the supporting frame 190 directly connected with the moving coil 187, and pulled by the magnet plungers 192 and 193 which are fixed at both sides of the supporting frame 190. Accordingly the inner housing 194 is able to incline to the right or left along the supporting frame 190 in a circular arc the center of which is aligned to the tracking point 211 on the record 209. The inner housing 194 contains a horizontal and vertical distance detecting mechanism and the tracking mechanism shown in FIG. 13 in addition to the optical scanning mechanism 195 described above with reference to FIGS. 1 to 11.

The horizontal and vertical distance detecting mechanism disposed within the inner housing 194 is described hereinafter. An incandescent bulb 196 having a fine and small filament is attached to a part of the inner housing (194), and the power is supplied from the terminals (197) and (198). The light beam issued from the incandescent bulb (196) impinges a planar record surface in a relatively wide zone on both sides of the tracking point via the lenses (199) and (200). It is reflected from some non-recorded parts, and reaches the photo-sensitive elements (202) and (205) e.g., photo-diodes as the light beams (207) and (208). The signal recorded grooves and the non-recorded parts of the record (209), i.e. the record surface, is designated by the numeral (210). The photo-sensitive elements (201) and (203) are disposed on both sides of the photo-sensitive element (202) as shown in the drawing. Similarly, the photo-sensitive elements (204) and (206) are disposed on both sides of the photo-sensitive element (205).

If the right part relative to the scan tracking point of the record 209 ascends and the left part thereof descends because of surface distortion, undulation, or the like, the right signals of the decoded signals are compressed, and the left signals are elongated. In order to compensate for this condition, the center of the deflection sweep of the scanning light beam should be made to lie on a line which is normal, i.e., vertical to the tracking point. When the right part of the record surface (210) is inclined upward, and the left part is inclined downward, the right beam (207) reaches the photo-sensitive element (201) deviating from the photo-sensitive element (202), and the left beam (208) reaches the photo-sensitive element (206) deviating from the photo-sensitive element (205). When the record surface (210) is inclined conversely, i.e. the right part descends and the left part ascends, the beams respectively reach the photosensitive elements (203) and (204). Therefore, if the electrical output of the photo-sensitive element (201) is larger than that of the photo-sensitive element (202), because the record surface is inclined, the right part upward and the left part downward, the magnet plungers 192 and 193 are actuated by the voltage difference between the outputs of the photo-sensitive elements 202 and 201 so as to move the sliding place 191 leftwards, and thereby the inner housing 194 of the photoelectric play-back mechanism can be inclined leftwards. As a result, the scanning light beam centers just over the tracking point. When the record surface is inclined, with the right part downward, and the left part upward, the inner housing 194 can be inclined rightwards in a similar manner.

As abovementioned, compensation for the inclination of the record surface can be carried out by the photoelectric playback mechanism. If the record surface is distorted or undulated, the record surface is unavoidably inclined. Additionally, it is necessary to uniformly maintain the distance of the photoelectric play-back mechanism, i.e. the inner housing 194, from the record surface 210. If such compensation is not made, both right and left signals are subjected to alteration such as compression and elongation. In order to compensate for changes in distance, an operation similar to the compensation for inclination may be executed. Namely, at the normal position, the reflected beams reach the photo-sensitive elements 202 and 203, and when the relative distance between record 209 and the outer housing 183 is shortened, the reflected light beams respectively reach the inner photo-sensitive elements 201 and 204. At this time, an electric current from the photo-sensitive elements 201, 204 is applied to the moving coil 187 to pull the inner housing 194 upward, and the relative distance is kept uniform. On the contrary, when the relative distance is elongated, an electric output is generated at the outer photo-sensitive elements 203 and 206. In this case, the electric current flowing through the moving coil 187 is reversed in order to push the inner housing 194 downward to achieve the normal distance between the record 209 and the housing 183.

Table 1 shows actions of each part in horizontal and vertical compensations which have been described hereinbefore.

Table 1

| photo-sensitive element (photo diode) | | | | | | inclination compensation | vertical distance compensation |
|---|---|---|---|---|---|---|---|
| 206 | 205 | 204 | 201 | 202 | 203 | plunger | moving coil |
| H | | | H | | | ← | X |
| H | | | | H | | ← | ↓ |
| H | | | | | H | X | ↓ |
| H | | | H | | | ← | ↑ |
| H | | | | H | | X | X |
| H | | | | | H | → | ↓ |
| | H | H | | | | X | ↑ |
| | H | | | H | | → | ↑ |
| | H | | | | H | → | X |

In Table 1, (H) means that the light beam is incident upon the photo diode. The arrow means the direction in which the plunger or the moving coil is moved. (X) means that no action is made. Since the surface distortion or the undulation occurs only once or twice in one rotation of the record, very slow compensation is sufficient. Any type of light source 196 can be used, if it is relative small.

Figure 13:
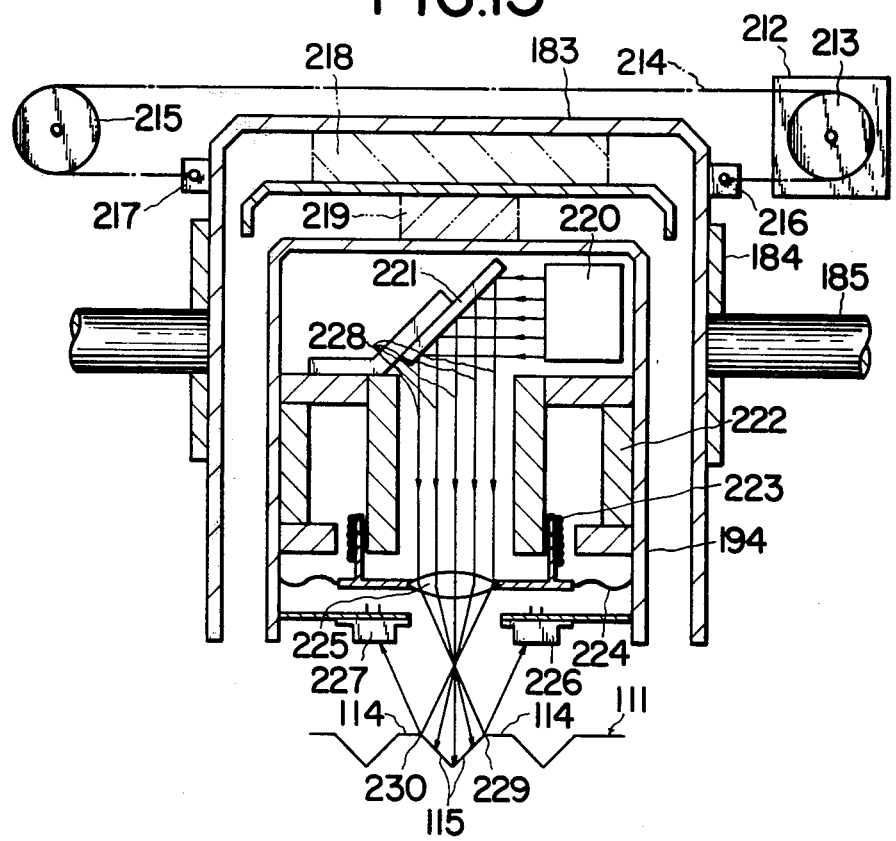
FIG. 13 is a sectional elevation view of a tracking mechanism.

One example of a mechanism for tracking on the required signal recorded groove is described hereinafter referring to FIGS. 13 to 15. In FIG. 13, the tracking mechanism is shown. The photoelectric play-back mechanism shown in FIG. 1 is disposed within the inner housing (194), and the relative displacement compensating mechanism shown in FIG. 12 is also disposed within the inner housing (194). The outer housing (183) is the same as that described referring to FIG. 12, and slides on the guide rail (185) which is supported by means of the bearing (184). The outer housing (183) is provided with clasps (216) and (217) to which the wire (214) is connected. The wire (214) is put around the pulleys (213) and (215). The pulley (213) is driven by the servo-motor (212) so as to move the outer housing (183) rightwards or leftwards. Between the outer housing (183) and the inner housing (194), there is located the vertical distance adjusting mechanism (218) and the inclination compensating mechanism (219) explained above with reference to FIG. 12. The narrow scanning light beam generator (220) is disposed within the inner housing (194). The narrow light beam issued from the generator (220) is deflected by the reflecting mirror (221) so as to be directed downwards as the narrow light beam (228). The narrow light beam (228) is diffused after being converged by the lens (225). The diffused light beam irradiates the signal recorded groove (115) and the non-recorded part (114) on the record surface (111). The lens (225) is supported by the moving coil (223) of a motor mechanism consisting of the magnet (222), the moving coil (223), and the damper (224). The lens 225 is moved upwards or downwards by the electric current flowing through the moving coil (223). The photo-sensitive elements (226) and (227) such as photo diodes are disposed on both sides of the lens (225) in order to receive the light beams reflected from the non-recorded part (114) of the record.

If the diffused light beam, after passing through the lens 225 enters entirely into the recorded groove, no photoelectric output is generated at the photo-sensitive elements (226) and (227). In that case, the lens (225) is moved upwards so as to extend the width of the diffused light beam incident upon the signal recorded groove. Therefore an electric current is applied to the moving coil so as to pull it up until the diffused light beam irradiates the non-recorded part (114). If the quantity of light beams which is reflected from the non-recorded part and incident upon the photo-sensitive elements (226) and (227) exceeds a certain value, the electric current flowing through the moving coil (223) is converted so as to push the lens (225) downward, and make the width of the diffused light beams narrow. The central position of the vertical movement of the lens 225 is determined by the average value of the amount of the light beams reflected at the border positions (229) and (230) between the signal recorded groove and the non-recorded parts on the record surface (111), as indicated by the magnitude of the outputs of the photo-sensitive elements. If some difference exists between the electrical signal outputs of the photo-sensitive elements (226) and (227), the servomotor (212) is caused to rotate by this difference of the electrical outputs in order to perform tracking in such a manner that the central axis of the light beam (228) is maintained on the average center of the signal recorded groove.

Table 2 shows the tracking actions plainly.

Table 2

| manner | output of left photo diode | output of right photo diode | moving coil | tracking |
|---|---|---|---|---|
| 1 | H | H | ↓ | X |
| 2 | L | H | X | ← |
| 3 | H | L | X | → |
| 4 | L | L | ↑ | X |
| 5 | H | H | ↓ | X |
| 6 | S | S | X | X |

In Table 2, the column of "manner" indicates where the light beam diffused after passing through the lens (225) is incident upon the signal recorded groove and the non-recorded part on the record surface. (H) means that the reflected light beam is incident upon the photo-sensitive element, and (L) means that the reflected light beam is not incident upon the photo-sensitive element. (S) means that the input of the reflected light beam is about the half of that amount occurring in cases indicated by (H). The arrow in the column of "moving coil" means the direction in which the moving coil (223) is moved, with the lens (225). (X) means that no mechanical actuation is made. The arrow in the column of "tracking" means the direction in which the photoelectric play-back mechanism is moved by moving the servomotor 212.

In summary, the lens 225 is moved vertically so as to measure the average width of the signal recorded grooves, and the servomotor and lens 225 are moved laterally by the voltage difference in the outputs of the photo-sensitive elements 226, 227 in order to perform the tracking of the required recorded groove. As understood from the above description, since no recorded signal component is required in the tracking action, it is necessary to remove the output of the photo-sensitive element more than about 20 Hz by integration.

Figure 14:
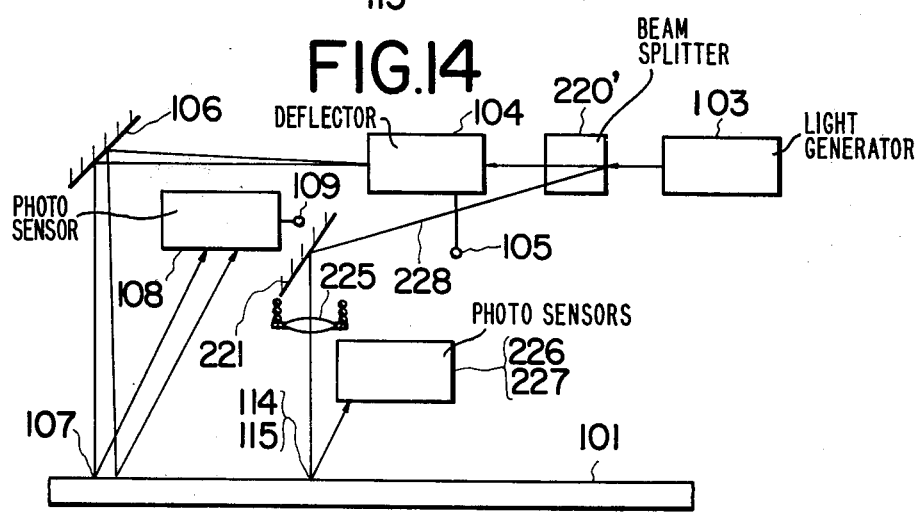
FIG. 14 is a semi-schematic view indicating the principle of obtaining a narrow light beam for the tracking mechanism of FIG. 13.

An example of the narrow light beam generator 220 shown in FIG. 13 is shown in FIG. 14. In FIG. 14, the beam splitter 220' is disposed between the generator 103 and the deflector 104 which are shown in FIG. 1 and discussed above so that one generator 103 is also used as the light source of the photoelectric play-back mechanism. A half-mirror is used as the beam splitter 220' in one embodiment.

In the above description, the tracking for the play-back of a record has been explained on a photoelectric play-back mechanism moving on parallel guide rails. A similar tracking operation is also possible using a photoelectric play-back mechanism attached to the forward end of an arm which circularly pivots like a conventional tone-arm. It will be clearly understood that the tracking action on the other recorded medium is remarkably easy in comparison with that in the play-back of a record, because pitches between adjacent recorded grooves are uniform, and the average widthes of signal recorded grooves are uniform.

In the tracking mechanism described referring to FIGS. 13 and 14, the narrow light beam, the optical device, and the photo-sensitive elements for the play-back of recorded signals, and the narrow light beam 228 and the photo-sensitive elements 226 and 227 for the tracking of a signal recorded track are separate. An apparatus provided with such separate but similar devices has an advantage that the recorded signal play-back system can be separated from the tracking control system. This physical arrangement however, has some defects in that the play-back is inaccurate, and the structure of the apparatus is complex and large, because the position to which the tracking is adjusted and measured is different from the position from which recorded signals are played back.

An embodiment to resolve these defects is described with reference to FIGS. 15 to 21. This embodiment makes it possible to obtain tracking signals on a specified recorded groove simultaneously with the process of picking up and playing back recorded signals from that groove. Therefore, a separate optical and detecting system for tracking is omitted. FIG. 15 is the block diagram of the electrical system of this embodiment.

Figure 16:
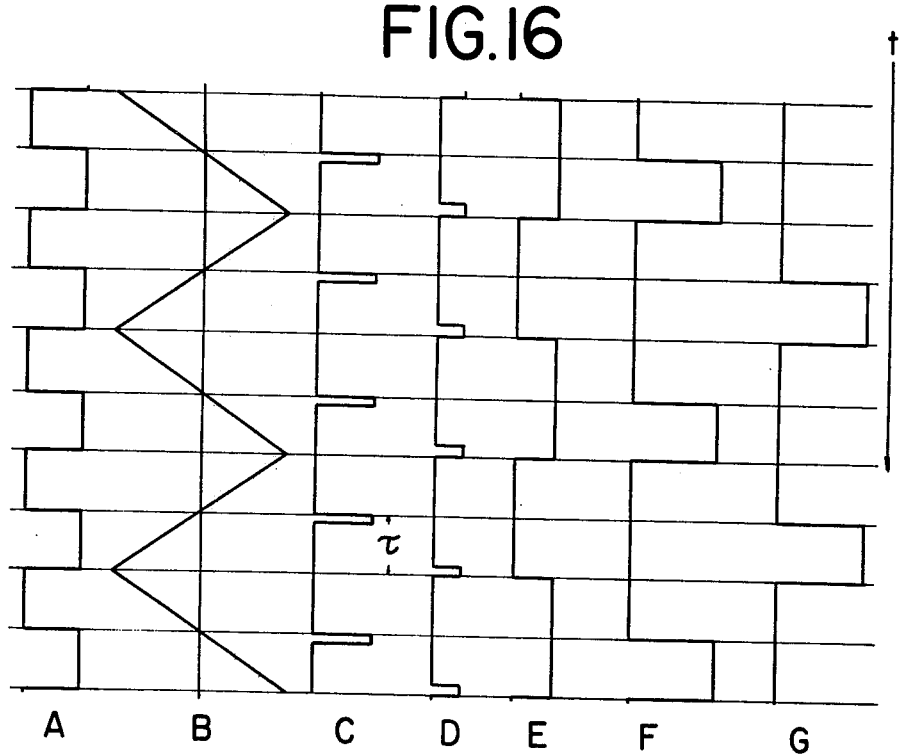
FIG. 16 is an explanatory view indicating the wave form and the phase of each part in the block diagram of FIG. 15.

The fundamental wave oscillator 320 is an oscillator which generates fundamental waves of predetermined frequency such as square waves (A) and (E) shown in FIG. 16. A triangular wave for scanning beam deflection, designated by (B) in FIG. 16, is made from the fundamental wave by the wave processing amplifier 321 and fed to the terminal 105 of the deflector 104 shown in FIG. 1 through the terminal 322. The fundamental oscillator 320 and the wave processing amplifier 321 are used in order to actuate the deflector 104 to deflect the narrow light beam. On the other hand, the fundamental wave is applied to the standard pulse oscillator 323, the scanning end pulse oscillator 324, and the gate wave oscillator 325. The standard pulse generated at the standard pulse oscillator 323 is designated by (C) in FIG. 16. The standard pulse is generated from each rising edge of the fundamental wave (A), and its phase is in conformity with the central point of the amplitude of the deflected wave (B). The scanning end pulse (D) generated at the oscillator (324) rises just before the end of the scanning, and falls at the time of the end of the scanning. The pulse (D) is obtained by delaying the standard pulse (C) by (r) shown in the drawing. At the gate-wave oscillator (325), right signal gate pulse (F) and left signal gate pulse (G) are generated from the fundamental wave (A) and its inverse wave, and the wave (E) and its inverse wave. The photo-sensitive element (326) for the right deflection of the scanning light beam, and the photo-sensitive element (327) for the left deflection thereof are respectively processed into waves of required voltage, for example rectangular waves ($H_R$) and ($H_L$) shown in FIG. 18, by the processing amplifiers (328) and (329). The outputs of the processing amplifiers are further respectively led to the right signal gate simplifier (330) and the left signal gate amplifier (331). On the other hand, the outputs of the processing amplifiers (328) and (329) are combined and applied to the tracking discriminator (332).

If the tracking and the optical scanning are being performed normally, i.e. the center of the deflection in the optical scanning exists at the average center of a required groove, the tracking discriminator (332) senses the normal tracking, and does not affect the gate-wave oscillator (325) at all. Therefore, since the right signal gate pulse and the left signal gate pulse generated at the gate-wave oscillator (325) can respectively actuate the right signal gate amplifier (330) and the left signal gate amplifier (331), the right signals issued from the processing amplifier (328) and the left signals issued from the processing amplifier (329) can pass through the amplifiers (330) and (331). These signals are respectively led to the clearing terminals of the flip-flop circuits (333) and (334). On the other hand, the standard pulses generated at the oscillator (323) are supplied to the flip-flop circuits (333) and (334) as the setting input. Therefore, since these flip-flop circuits (333) and (334) are set by the standard pulses, and are respectively cleared or reset by the rising edge of the right signal and the rising edge of the left signal, the right and left pulse-width modulated waves corresponding to the time duration beginning with the center of the groove which is being scanned and ending with the edge of the groove can be given to the right signal output terminal (335) and the left signal output terminal (336). These terminals (335) and (336) are respectively connected with right signal decoder and the left signal decoder as described above.

In case of abnormal tracking, the discriminator (332) affects the gate-wave oscillator (325) so that outputs are not issued at the signal output terminals (335) and (336), and thereby it is possible to prevent any noise from occurring.

The tracking discriminator (332) supplys the tracking error voltage to the servo-amplifier (337) in case of abnormal tracking. In that case, the servo-amplifier 337 is set in such a manner that the photoelectric play-back mechanism shown in FIG. 2 moves toward the center of the record, i.e. leftwards, so that the center of the scanning light deflection can be drawn over a signal recorded groove. (rough tracking)

The precise tracking will be described hereinafter. In the precise tracking, the center of the light deflection is placed at the average center of a signal recorded groove by using a pulse-width to voltage converter. The output signals obtained at the right signal output terminal (335) and the left signal output terminal (336) respectively include a direct current component based on the width of the signal recorded groove and an alternating current component corresponding to the recorded signal. The output signals are converted into signals having voltage proportional to the width of the signal recorded groove by the pulse-width to voltage converters (integrator or the like) (340) and (341), and thereafter the converted signals are smoothed by the low-pass filters (338) and (339) so as to remove the signal component. The precise tracking can be performed, i.e. the photoelectric play-back mechanism shown in FIG. 2 can be placed at the average center of the signal recorded groove, by supplying the smoothed signals to the servo-amplifier (337) so that the voltages of both signals are compared with each other. The tracking servo-output obtained at the output terminal (342) of the servo-amplifier (337) is supplied to a servomotor which is used to move the photoelectric play-back mechanism in a direction transverse to the record groove. In case of abnormal tracking, a pulse-width to voltage converters (340) and (341) can not get any input signal by the action of the discriminator (322), and thereby they automatically stop their working.

Figure 15:
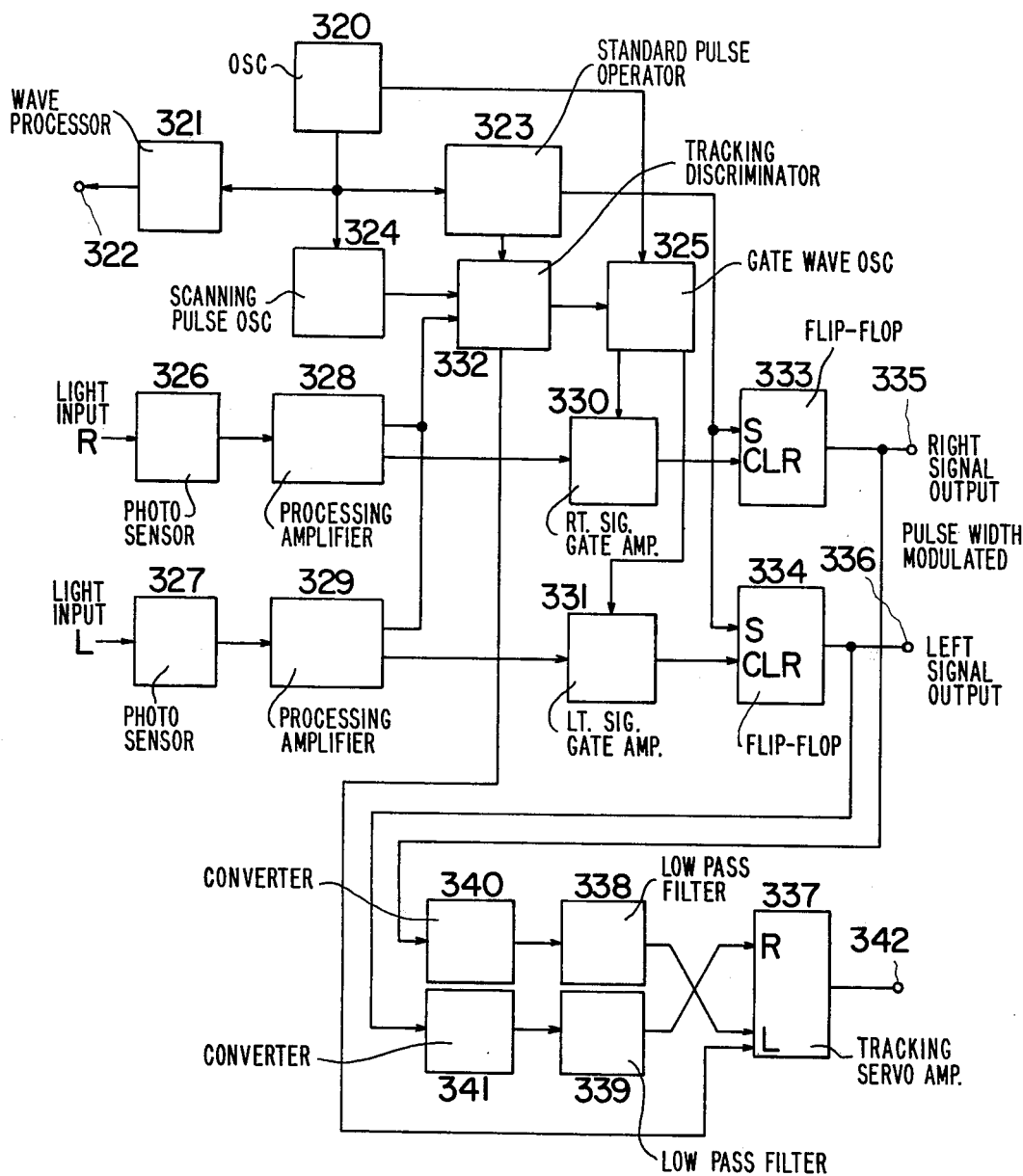
FIG. 15 is a block diagram in the embodiment in which the tracking is performed at the time of obtaining play-back signals.
Figure 17:
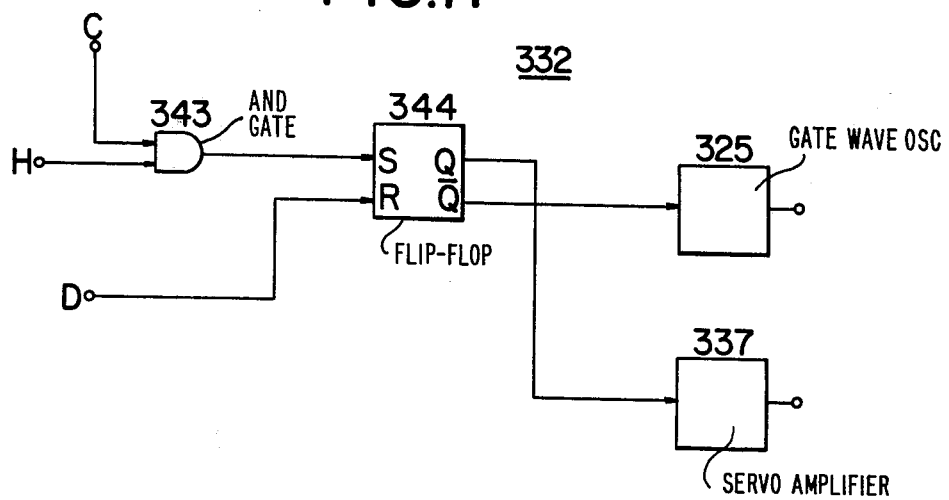
FIG. 17 is a circuit diagram of a tracking discriminator.

In FIG. 17, an example of the tracking discriminator (332) indicated in the block diagram of FIG. 15 is shown in detail. An electric signal (H) obtained by a optical scanning is connected with one input of the gate circuit (343) such as an AND circuit, and the standard pulse (C) is connected with another input. Therefore, if any signal based on the tracking error is received within the time duration of the standard pulse, and AND output is obtained from the gate circuit (343). The AND output sets the flip-flop circuit (344), and thereby a high output is obtained at the Q terminal thereof, and the servo-amplifier (337) is actuated to move the photoelectric play-back mechanism in the direction of the center of the record (leftward). At the same time, the output of the Q terminal of the flip-flop circuit 344 changes from high potential to low potential, and thereby the gate-wave oscillator (325) connected with the Q terminal stops the generation of gate signals. Since the scanning end pulse (D) is given to the flip-flop circuit 344 as the resetting input, the flip-flop circuit is reset concurrently with the end of the optical scanning of the right and left side recorded signals. However, if the setting input is received again as abovedescribed, the abovedescribed action is made again, and the action continues until the condition is obtained that the even part of the record does not come to the position of the standard pulse. As the result, when some tracking errors exist, the occurrence of the signal play-back output, i.e. noise, can be prevented, and the center of the optical scanning sweep can be drawn over the record groove.

Figure 18:
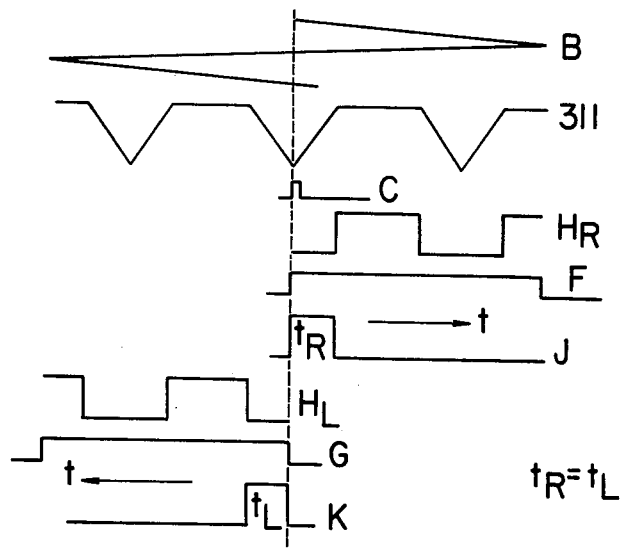
FIG. 18 is an explanatory view indicating the normal tracking condition.

The tracking mechanism maintaining the center of the scanning light deflection at the center of the groove will be described hereinafter in detail. FIG. 18 shows the condition when normal tracking is performed. The character (B) designates a deflecting wave (sweep) which is scanning the record surface 311. The standard pulse (C) occurs in time with scanning of the center of the record groove as shown in the drawing. The characters ($H_R$) and ($H_L$) designate waveforms obtained at the outputs of the right and left photo-sensitive elements as a result of the optical scanning. The character (F) designates a right signal gate pulse, (G) a left signal gate pulse, (J) a right recorded signal made from the standard pulse (c) and the output ($H_R$) of the right photo-sensitive element, as described above, and (K) a left recorded signal made from the standard pulse (C) and the output ($H_L$) of the left photosensitive element. The time durations of the signals (J) and (K) are designated by the characters (tR) and (tL).

Figure 19:
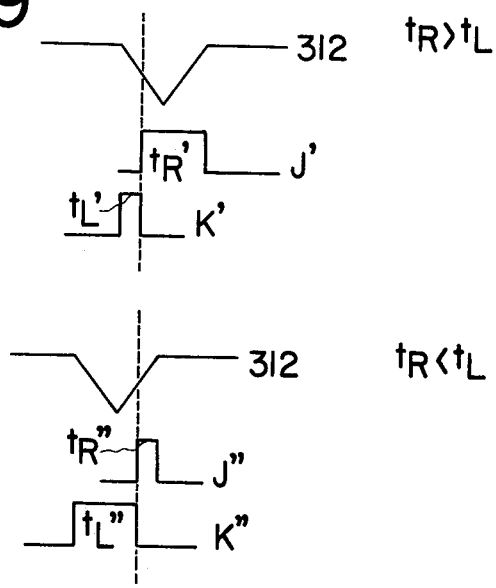
FIG. 19 is an explanatory view indicating the principle of setting the center of the light deflection at the center of the record groove.

FIG. 19 indicates the principle of the tracking mechanism in which the tracking is performed so that the central position of the photoelectric play-back mechanism once drawn into the tracking groove of the record is not put away again from the groove, or does not move within the groove. The movement of the play-back mechanism within the groove in a frequency less than that of the audible sound is harmless. In FIG. 19, when the central point of the scanning light deflection is displaced leftward with respect to the recorded groove 312, the time durations of the right and left signal outputs which are obtained at the signal output terminals 335 and 336 shown in FIG. 15 are made unequal like the outputs (J') and (K'). When the central part of the scanning light deflection is displaced rightward, the time durations are made unequal like the outputs (J") and (K"). When these separated signals are averaged, and the servo-amplifier 337 shown in FIG. 15 is actuated by the difference, the center of the scanning light deflection is always placed at the center of the recorded grooves.

In the abovedescribed embodiment FIG. 15, the electric signal outputs of the right photo-sensitive element 326 and the left photo-sensitive element 327 are passed through the processing amplifiers 328 and 329, and these play-back electric signal outputs are respectively led to the right signal gate amplifier 330 and the left signal gate amplifier 331. As is apparent from the above description, since the generation of electric signals of the photosensitive elements occur, and the right and left signal gates are actuated relative to a time axis, the right photo-sensitive element 326 may be connected with the left photo-sensitive element 327 in parallel, or only one photo-sensitive element may be used. In that embodiment with only one photo element, only one processing amplifier, e.g. 328 is sufficient, and the electric signal output of the amplifier is connected with the right signal gate amplifier 330 and the left signal gate amplifier 331. In yet another embodiment, the same approach using a single photo sensor and amplifier may be applied to the embodiment described referring to FIGS. 1 and 2.

Figure 20:
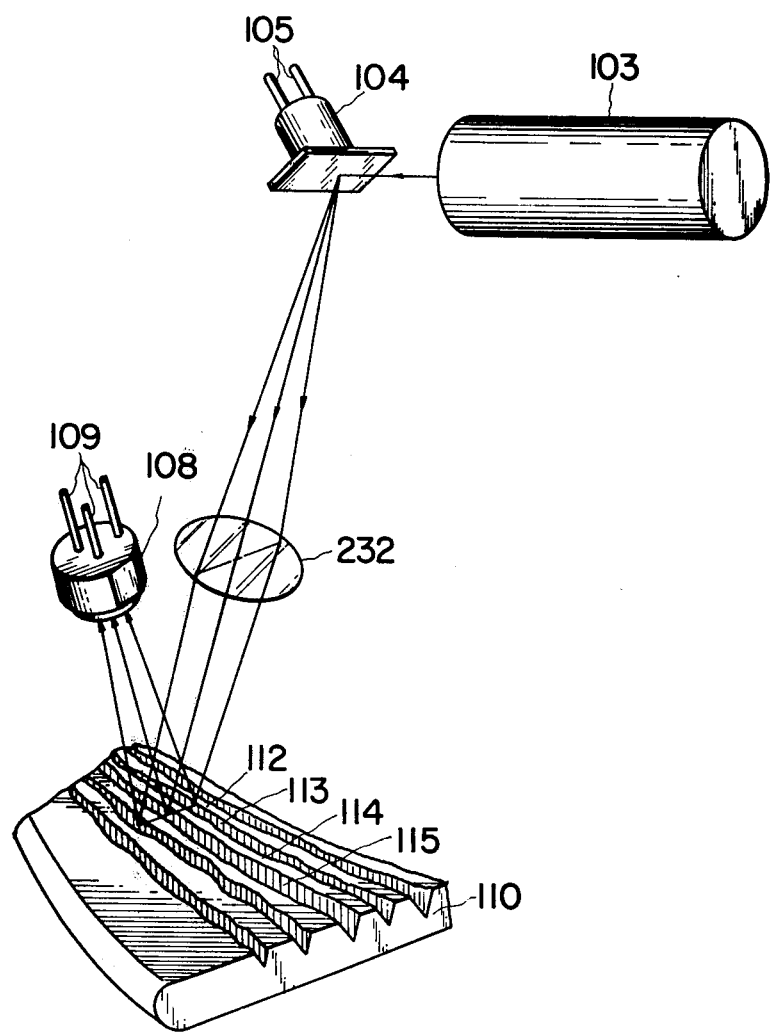
FIG. 20 is a perspective view of a photoelectric play-back mechanism using only one photo-sensitive element.

In FIG. 20, a structure of a photoelectric play-back mechanism is shown which uses only one photo-sensitive element. The narrow light beam issued from the generator 103 is deflected for scanning as described above by the deflector 104 utilizing the oscillation of the mirror surface which is an integral part of the deflector 104. The light beam is converged by the converging lens 232 so as to be focused on the record surface. The terminal 105 of the deflector 104 gets the deflecting voltage of a selected frequency and waveform for scanning. The narrow light beam is incident upon the record surface consisting of grooves 113 and 115 and even parts 112 and 114. The deflecting direction is perpendicular to the direction of the groove, and the direction of the incidence is slightly oblique to the record surface. The photo-sensitive element 108 is provided on the opposite side of the converging lens so as to receive the narrow light beam refected from the record surface. The electric signal output of the photo-sensitive element is available at the connector 109. The numeral 110 designates a segment of the grooved record.

In the above embodiment (FIG. 20), the play-back signals and the tracking signals of the recorded track are obtained concurrently from the photoelectric play-back mechanism.

The apparatus, in which signals are automatically played back by utilizing electric signals obtained from the abovedescribed photoelectric play-back mechanism and from the standard-wave electric signals for optical scanning, will be described hereinafter. FIG. 21 is a block diagram of the apparatus. At the outset the photoelectric play-back mechanism is resting and is housed. When the starting switch 346 is turned on, since its output is connected with the setting input of the flip-flop circuit 347, a high output is caused at the Q terminal of flip-flop 347. Thereby the servo-amplifier 337 is actuated, and the one-shot multivibrator 348 is turned on. The output of the one-shot multivibrator 348 rises in a moment, and disappears several seconds after its rise. Since the flip-flop circuit 349 is cleared at the time of the rise, the output of its $\overline{Q}$ terminal is made high potential, and thereby the gate of the non-signal detector 345 connected with the $\overline{Q}$ terminal is opened. The non-signal detector 345 is connected with the pulse-width to voltage converters 340 and 341 shown in FIG. 15 through the low-pass filters 338 and 339. In the case of a non-signal, i.e. when no input is given to the photosensitive element of the photoelectric play-back mechanism, because the mechanism is still housed and tracking is not performed normally, the gate of the detector 345 is opened and a signal of specified voltage is issued to the servo-amplifier 337. The detector 345 continues to supply the specified voltage to the leftward input (L) of the servo-amplifier 337 while the photoelectric play-back mechanism driven by the servo-amplifier output begins to move toward the center of the record from its housed place, and is positioned above the record surface. Accordingly, the photoelectric play-back mechanism can be moved toward the center of the record, i.e. leftward, by pushing the starting button 346. Until the mechanism is positioned over the record surface, almost no input is given to the photo-sensitive element, because the scanning narrow light beam diffuses very much, and a black mask (not shown) for absorbing diffused reflection is used.

When the photoelectric play-back mechanism is positioned above the record, the tracking discriminator 332 shown which includes the flip-flop circuit 344 and is also in FIG. 17 is actuated so as to continue to give leftward input (L) to the servo-amplifier 337 until a record groove is caught by the light beam. When the first introductory non-signal groove is caught, high output is given to the $\overline{Q}$ terminal of the flip-flop circuit 344 of the tracking discriminator. This opens the gate 325 to pass the play-back signal when the photoelectric play-back mechanism catches the record groove. It also means that the center of the scanning light deflection exists within the record groove, and thereby the play-back begins from this point.

In this system, when there is no groove on the left side of the groove which is being tracked, i.e. there is no next groove on the side toward the center of the record, the photoelectric converter automatically detects it, and returns the photoelectric play-back mechanism to the original starting position. The returning action is executed only when no next adjacent groove is detected over several seconds. Therefore, the returning action never occurs when there is no left adjacent groove at the introductory part of the record or at the non-signal part between two different programs. As stated above when there are no pulse width modulated signals inputted to the converters 340, 341, the non-signal gate 345 causes the servo-amplifier 337 to drive the play-back mechanism toward the record center (left).

The returning action is described hereinafter in detail. There are three inputs at the AND circuit 350. The first input is the $\bar{Q}$ signal of the flip-flop circuit 344 given through the terminal 351. The second input is the scanning end pulse (D) (See FIG. 16) given through the terminal 352. The third input is the $\bar{Q}$ output of the flip-flop circuit 353. The terminal 354 is an input terminal of the left signal ($H_L$)(FIG. 18). The polarity of the left signal ($H_L$) is inverted by the inverter 355, and thereafter it is connected with the setting input of the flip-flop circuit 353. The clearing input of the flip-flop circuit 353 is the standard signal pulse (C) given through the terminal 356, and a high output signal is caused at the $\bar{Q}$ output of the flip-flop circuit 353 upon the occurrence of the standard signal pulse (C). If there is an adjacent next groove, the signal of the groove is given to the setting input of the flip-flop 353 so that the $\bar{Q}$ output is made zero. If there is no adjacent next groove during the scanning, no pulse is given to the setting input of flip-flop 353, and the $\bar{Q}$ signal output remains at its high output level.

Therefore, when the first input is given to the AND circuit 350 from the flip-flop 353, i.e. the tracking is normally performed, and when concurrently the second input (D) is given to the AND circuit 350, i.e. the scanning has finished, and when concurrently the third input is given from the flip-flop 344, i.e., there is no next signal groove, an output, the time phase of which is the same as that of the scanning end pulse (D), is caused at the AND circuit 350. The output is fed to the input of the one-shot multivibrator 357, and drives the next one-shot multivibrator 358 at the finishing point of the one-shot wave of the multivibrator 357. The AND circuit 359 receives the output of the one-shot multivibrator 358 and the output of the AND circuit 350. The time constant of the one-shot multivibrator 357 is set to several seconds. The period of several seconds is enough to cover the introductory part of the record groove and the part between two different programs where there is no adjacent next groove. The time constant of the next one-shot multivibrator 358 is set to a period in which more than one scanning end pulse (D) is surely picked up, i.e. at least a full scan cycle.

When the photoelectric play-back mechanism is positioned at the circular non-signal groove which is the finishing part of the record groove, it is confirmed after several seconds that there is no next adjacent groove. Thereafter an output is caused at the AND circuit 359, and the flip-flop cicuit 349 is set. The flip-flop circuit 344 is cleared by the high output Q of the flip-flop circuit 349 so as to stop its function. The Q output of the circuit 349 is also given to the rightward input (R) of the servo-amplifier 337 so that the photoelectric play-back mechanism is returned to the outside of the record, i.e. its housing place as before the play-back. At its housing place, there is the switch 360, such as a microswitch, for indicating the stop position of the mechanism. When the photoelectric play-back mechanism is positioned at its stop, the switch 360 is actuated, and the flip-flop circuit 347 is cleared. Thereby the function of the servo-amplifier 337 is stopped. Accordingly, the whole system is placed at the original condition, and waits for the next starting indication.

In the relative displacement compensating mechanism described referring to FIG. 12, a separate light source 196 and optical devices 199 and 200 are provided for compensation in order to maintain a specified interval between the photoelectric play-back mechanism and the recorded medium surface. And a separate narrow light beam, optical devices, and photo-sensitive elements are provided for extracting recorded signals. The light issued from the light source irradiates the recorded medium surface so that the positions of the reflected light is measured by a plurality of photo-sensitive elements 201 to 206. As stated above an electrical output for adjusting the interval (distance) is obtained and supplied to the motor mechanism in order to move the photoelectric play-back mechanism so as to maintain the interval between the photo-electric play-back mechanism and the recorded medium surface and to compensate for the inclination of the record surface. In that system, (FIG. 12), however, there are some design inefficiencies in that a light source and photo-sensitive elements are required in order to adjust and maintain the interval, in addition to the photoelectric play-back mechanism for picking up recorded signals, because the position of detecting a recorded signal is different from that of measuring the interval. The interval is indirectly measured at a position slighty away from the recorded signal extracting position.

An embodiment to alleviate the above design inefficiency is described hereinafter referring to FIGS. 22 and 23. This embodiment provides a simple and effective means to compensate for the displacement of the recorded medium. FIG. 22 indicates the configuration where a converging lens 411 is moved along the optical axis in order to maintain a uniform focal distance as the vertical movement of the record surface causes the reflecting point on the record surface to be displaced from an ideal generally planar locus. In FIG. 22, and as described above, the narrow light beam issued from the generator 103, e.g., a helium neon laser, is subjected to a deflection by the deflector 104 perpendicular to the drawing plane for regularly repeated optical scanning. The deflected light beam is made sufficiently narrow by the converging lens 232, and reaches the scanning point 406 on the record surface 101 having recorded grooves. The reflected light beam 418, which is modulated in accordance with the changes in the shapes of the non-recorded part and the recorded groove as aforesaid, reaches the photo-sensitive element 108, and an electric signal is obtained at the terminal 109.

If the record surface moves upward by the distance ($D_1$) because of the warp of the record, and is placed at the position designated by the numeral (410), the above scanning point (406) moves to the position designated by the numeral (412). If the distance ($D_1$) is detected by the different photo-sensitive elements provided on both upper and lower sides of the photo-sensitive element (108), and the converging lens (232) is moved by the signals issued from them by the distance ($L_1$) between the scanning points (406) and (412) and placed at the position designated by the numeral (411), the focal distance between the converging lens and the record surface is kept uniform, and thereby the signal analyzing ability at the time of extracting the recorded signal is never deteriorated. In this case, if the converging lens (232) is connected with the photo-sensitive element (108) through means of the connecting plate (409), the narrow light beam reflected upon the scanning point (412) moves as designated by (419) and is incident upon the position (413) to which the photosensitive element (108) is moved. The scanning point moves from the position (416) to the position (412). If the record is turned in the direction of arrow (R), since the scanning point moves by the distance (P₁) between the perpendicular axis (Z) passing the scanning point (406) and the perpendicular line passing the scanning point (412), the frequency of the play-back signal is compressed, i.e. the frequency is made high, and thereby when the record surface moves up and down, the wow-type distortion is caused with the rotation of the record.

When the record surface (101) moves downward by the distance (D₂) and is placed at the position designated by the numeral (414), the scanning point moves from the position (406) to the position (416), and the converging lens (232) is pushed down along the optical axis by the distance (L₂) and is placed at the position designated by the numeral (415). The light beam (420) reflected upon the scanning point (416) is incident upon the position (417) to which the photo-sensitive element (108) is moved, so that the recorded signal can be picked up. In this case, the horizontal moving distance of the scanning point on the record surface is designated by (P₂), and the recorded signal is elongated, i.e. frequency is made low, and thereby periodrical distortion is caused with the rotation of the record.

In order to prevent the above distortion, it is required that when the converging lens (232) is moved along the optical axis by the distance (L₁) or (L₂), the converging lens and the deflector are also moved by the distance (P₁) or (P₂) in the direction parallel with the record surface, and that makes the structure remarkably complex.

FIG. 23 indicates an apparatus where the converging lens is moved along the perpendicular axis of the record surface in order to compensate for the change of the focal distance in accordance with the vertical displacement of the record surface. The narrow light beam issued from the generator (103) is subjected to the deflection perpendicular to the drawing by the deflector (104). The light beam subjected to the repeated deflection is irradiated upon the scanning point (406) on the record surface (101) by the converging lens (232). The irradiating direction is a little inclined from the direction perpendicular to the scanning direction. The reflected light beam (418) subjected to strong or weak modulation by the non-recorded part and the recorded groove respectively reaches the photo-sensitive element (108) so that an electric signal output is provided at its terminal 109. In FIG. 23, photo-sensitive elements (423) and (425) for discriminating the vertical position are provided on both upper and lower sides of the central photo-sensitive element (108) for recorded signals. These photo-sensitive elements (108), (423) and (425) ar not physically connected with the converging lens (232), but are fixed on the base of the photoelectric play-back mechanism together with the deflector (104).

Assuming that the record surface (101) moves upward by the distance (D₁) and is placed at the position designated by the numeral (410), the scanning point moves, and the reflected light beam (418) is not incident upon the photo-sensitive element (108), but incident upon the photo-sensitive element (423) as described referring to FIG. 22. The photo-sensitive elements (423) and (425) act differentially, after their electrical output signals are amplified and averaged, so as to vertically move the converging lens 232. The mechanism is provided such that when the light beam is incident upon the photo-sensitive element 423, the converging lens 232 is moved upward along the axis (CL) perpendicular of the record surface 101. Conversely when the light beam is incident upon the photo-sensitive element (425), the converging lens (232) is moved downward along the perpendicular axis (CL).

Accordingly, when the light beam is incident upon the photo-sensitive element 423, the converging lens 232 is moved perpendicularly upward and placed at the position designated by the numeral 411. At that time, the distane (L₁) is the same as the distance (D₁). The deflected light beam is incident upon the converging lens 411 at a position lower than its center, and is refracted and converged by the converging lens 411, and reaches the scanning point 412 of the elevated record surface 410. This scanning point 412 is positioned on the perpendicular axis (Z) above the scanning point 406 of the normal record surface 101, and the converging point of the light beam is about the same as the scanning point. The light beam 419, modulated and reflected at the scanning point 412, impinges on the recorded signal photo-sensitive element 108 at the same intersecting point as does the light beam 418 modulated and reflected at the scanning point 406.

On the other hand, when the record surface 101 moves downward by the distance (D₂) and is placed at the position designated by the numeral 414, in a manner similar to the above description, the converging lens 232 is moved by the electric signal output of the photo-sensitive element 425 by the distance (L₂) which is the same as (D₂) and is placed at the position 415. Accordingly, the narrow light beam is incident upon the converging lens 415 at a position apart from the center thereof and is refracted there. The refracted light beam is reflected from the scanning point 416, and the reflected light beam 420 reaches the photo-sensitive element 108 in the same vicinity as do light beams 418 and 419. The photo-sensitive surface of the photo-sensitive element 108 is set there. In this case, the scanning point 416 remains on the perpendicular axis (Z) passing the scanning point 406.

Therefore, the record surface is moved up and down, the converging lens 232 is moved perpendicularly to the record surface, and the coverging lens is focused without moving the scanning point on the record and the photo-sensitive element is placed at a fixed position. In this embodiment, since the distance between the deflector 104 and the scanning point 406 changes, the scanning amplitude at the scanning point changes. Accordingly periodical compression or elongation of the amplitude of the play-back signal is caused. However, when the distance between the deflector 104 and the converging lens 232 is suffuciently large as compared with the vertical moving distance of the record surface, such distortion is made very small.

In the above description (FIG. 23), the photo-sensitive elements 423, 425 for discriminating the vertical movement of the record are provided on both the upper and lower sides of the recorded signal play-back photo-sensitive element 108, one on one side and one on the other side. When in an alternative embodiment the normal surface position of the record is placed at the lowest position, one photo-sensitive element for discriminating upward surface movement and the recorded signal play-back photo-sensitive element are sufficient. Conversely two sensors can operate to adjust for variations from the highest normal surface position. In another embodiment, two photo-sensitive elements which are closely adjacent to each other are employed, and the reflected light beam is noramlly incident upon the center junction of the two adjacent photo-sensitive elements. The total output of both elements is used as the recorded signal play-back output, and the output difference of both elements is used as the electrical output for vertically moving the converging lens.

The tracking system described referring to FIGS. 15 to 20 showed desirable results. The inclination of the record surface due to bowing in a direction along a diameter of the record is very small. Therefore, compensation of this inclination is not absolutely required. However, in a case where such a small angular change causes trouble, a similar apparatus is employed as that described above in which photo-sensitive elements were provided on both upper and lower sides of a central photo-sensor so as to detect vertical displacement along a perpendicular axis. Namely, other photo-sensitive elements are additionally provided on the right and left sides of the central sensor so as to detect the displacement of the reflected light beam due to the inclination of the record, and mechanics similar to the vertical displacement compensating mechanism are employed for the compensation of the inclination.

In the above description referring to FIG. 23, the action for compensating the focal displacement has been described in a condition where the record surface moves only up and down as the record is kept generally horizontal, i.e. the peripheral part of the record is curved with respect to the center thereof. Practically, in addition to the vertical displacement, the peripheral part of the record is usually tapered modificated into the waveform, and the surface position smoothly changes within a small angle with respect to the horizontal direction. Such an angle is usually within ±0.5° with respect to the horizontal direction. This vertical displacement is usually within ±1.5 mm. For such a record the displacement of the position on which the reflected narrow light beam is incident at the photo-sensitive element due to the inclination within ±0.5° is about one-tenth of the influence due to the vertical displacement within ±1.5 mm. Accordingly, the displacement of the incidence due to inclination is negligible. However, if the axis (CL) along which the converging lens is moved as shown in FIG. 23 is inclined a little, i.e. about 0.5°, in the direction of the optical axis of the narrow light beam, slight effects of the movement of the scanning point as described in referring to FIG. 22 are combined, and the displacement of the position on which the reflected light beam is incident at the photo-sensitive element due to the inclination of the record, and the displacement of the scanning point can be compensated, even though it is very little displacement.

We claim:

1. A play-back system for reproducing information recorded on a medium, the information being recorded in the form of a continuous record track, with reflective surfaces on both sides of said track, the width of said track having been changed in accordance with the information comprising:

a first light source for reproducing a light beam, means for oscillating said beam transverse to said track and said reflective surfaces at a predetermined frequency and with an amplitude at least one-half of the average distance between tracks, means for moving said medium in a manner such that said track is substantially perpendicular to the oscillating direction of said beam, means for generating a reference signal signifying the center of oscillation of said beam, first photosensitive means for receiving light of said source reflected from said reflective surfaces of said medium to produce a signal representing the widths of said reflective surfaces, means for combining said signal representing the widths of said reflective surfaces with said reference signal to produce a modulated signal representing the average center and the edge of said track, and tracking means, electrically connected to said first photosensitive means, for having said first photosensitive means track said record track.

2. A play-back system according to claim 1, further comprising a common oscillator which controls said means for oscillating the light beam and said means for generating the reference signal.

3. A play-back system according to claim 1, wherein said combining means comprises two channels, each channel being arranged to receive the reference signal, one of said channels for reproducing the information on one side of the track and the other of said channels for reproducing the information on the other side of the track.

4. A play-back system according to claim 3, wherein each of said channels comprises a bistable circuit having one input for receiving the modulated signal and another input for receiving the reference signal.

5. A play-back system according to claim 3, wherein said tracking means comprises a coarse tracking circuit for generating a tracking error signal when said track is not properly tracked and means for moving said first light source and first photosensitive means in response to said tracking error signal in a predetermined direction.

6. A play-back system according to claim 3, wherein said tracking means comprises a fine tracking circuit, which includes two pulse width-to-voltage converters respectively responsive to said modulated signals and means for moving said first light source and first photosensitive means in the direction determined by the voltage difference supplied by said converters.

7. A play-back system according to claim 3, wherein said first photosensitive means comprises two photosensitive devices arranged to receive reflected light from respective sides of said track to produce respective signal components representing sampled distances of said track with respect to the average center thereof.

8. A play-back system according to claim 7, further comprising two gating devices respectively interposed between said photosensitive devices and said two channels, said gating devices being individually actuated to block the transmission of signal to said channels in accordance with the instructions fed by said tracking means.

9. A play-back system according to claim 1, further comprising compensation means, provided in a unit with said first photosensitive means, for maintaining a predetermined relative-positional relationship between said first photosensitive means and said medium even if the surface condition of said medium changes.

10. A play-back system according to claim 9, wherein said compensation means comprises a second light source for irradiating the medium, second photosensitive means for receiving the light from said light source after being reflected from the medium, and means for controlling the position of said first photosensitive means with respect to the surface of the medium depending on the light received by said second photosensitive means.

11. A play-back system according to claim 10, wherein said second photosensitive means comprises two photosensitive units, each unit comprising three photosensitive elements arranged side-by-side, disposed symmetrically with respect to said second light source, and said componsation means further comprises means for guiding the light from said second light source to impinge upon the central element of said photosensitive unit while said first photosensitive means is properly positioned with respect to the medium.

12. A play-back system according to claim 10, wherein said position controlling means comprises means for translating said first photosensitive means along a perpendicular line and means for inclining said first photosensitive means.

13. A play-back system according to claim 12, wherein said translating means comprises a moving coil and a magnet.

14. A play-back system according to claim 12, wherein said inclining means comprises a sliding piece provided in a unit with said second photosensitive means, a supporting frame having a circular arc portion on which said sliding piece is slidably mounted, magnet plunger means connected to said sliding piece, whereby said magnet plunger means become actuated in accordance with the light received by said second photosensitive means to determine the position of said sliding piece.

* * * * *